United States Patent
Hiramatsu et al.

(10) Patent No.: US 9,248,728 B2
(45) Date of Patent: Feb. 2, 2016

(54) DEFLECTOR DEVICE FOR VEHICLE

(71) Applicants: AISIN SEIKI KABUSHIKI KAISHA, Kariya-shi, Aichi-ken (JP); TOYOTA JIDOSHA KABUSHIKI KAISHA, Toyota-shi, Aichi-ken (JP)

(72) Inventors: Shinichi Hiramatsu, Chiryu (JP); Takanori Yano, Kariya (JP)

(73) Assignees: Aisin Seiki Kabushiki Kaisha, Kariya-shi, Aichi-ken (JP); Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/532,172

(22) Filed: Nov. 4, 2014

(65) Prior Publication Data
US 2015/0130228 A1    May 14, 2015

(30) Foreign Application Priority Data
Nov. 8, 2013   (JP) ................................. 2013-231750

(51) Int. Cl.
*B60J 7/22*    (2006.01)
(52) U.S. Cl.
CPC .......................... *B60J 7/22* (2013.01)
(58) Field of Classification Search
CPC ............................................ B60J 7/22
USPC ....................................... 296/217
See application file for complete search history.

(56) References Cited

U.S. PATENT DOCUMENTS

| 8,789,879 | B2 | 7/2014 | Sawada et al. | |
|---|---|---|---|---|
| 2004/0189057 | A1* | 9/2004 | Grimm et al. | 296/217 |
| 2008/0284211 | A1 | 11/2008 | Oerke et al. | |
| 2009/0309393 | A1* | 12/2009 | Pihale et al. | 296/217 |
| 2012/0086239 | A1* | 4/2012 | Uehara | 296/217 |

FOREIGN PATENT DOCUMENTS

| DE | 10 2005 054 185 A1 | 5/2007 | |
|---|---|---|---|
| DE | 10 2008 006 344 | 4/2009 | |
| DE | 10 2008 057 799 | 5/2010 | |
| DE | 10 2011 116 109 A1 | 4/2013 | |
| FR | 2845038 A1 | 2/2004 | |
| FR | 2983132 A3 * | 5/2013 | B60J 7/22 |
| JP | 2013-193601 A | 9/2013 | |

OTHER PUBLICATIONS

Notification of Reasons for Refusal for Japanese Application No. 2013-231750 dated Jul. 7, 2015.

* cited by examiner

*Primary Examiner* — Dennis H Pedder
(74) *Attorney, Agent, or Firm* — Finnegan, Henderson, Farabow, Garrett & Dunner, LLP

(57) ABSTRACT

A deflector device for a vehicle includes an upper frame arranged along the front edge of an opening formed in the roof of the vehicle, and a mesh member coupled to the upper frame and fixed at the front edge of the opening. The upper frame is raised and lowered with respect to the roof in accordance with the opening and closing operation of a movable panel, which opens and closes the opening. The mesh member is changed between a deployed state and a stored state in accordance with the raising and lowering of the upper frame. The upper frame includes a front end in the vehicle front-rear direction and a coupling position to which the mesh member is coupled. The upper frame includes a protrusion between the front end and the coupling position.

7 Claims, 3 Drawing Sheets

DEFLECTOR DEVICE FOR VEHICLE

BACKGROUND OF THE INVENTION

The present invention relates to a deflector device for a vehicle.

Japanese Laid-Open Patent Publication No. 2013-193601 discloses a deflector device for a vehicle that limits air vibration caused by wind swirling into a passenger compartment when an opening formed in the roof of a vehicle is opened. The deflector device disclosed in the publication includes a mesh member for limiting swirling of the wind. If a tilt-up operation is performed by the deflector device according to the opening operation of the movable panel, which opens and closes the opening, the mesh member comes into a deployed state. If the deflector device is pressed down according to the closing operation of the movable panel, the mesh member comes into a stored state.

In the deflector device of the above publication, the mesh member is generally changed from the deployed state to the stored state while being folded inward. However, if a situation in which the mesh member is not properly folded inward occurs in the middle of the change from the deployed state to the stored state, the mesh member may be caught between the circumferential edge of the opening and the movable panel.

SUMMARY OF THE INVENTION

An objective of the present invention is to provide a deflector device for a vehicle that inhibits the mesh member from being caught between the circumferential edge of the opening and the movable panel.

To achieve the foregoing objective, a deflector device for a vehicle includes: an upper frame, which is arranged along a front edge of an opening formed in a roof of a vehicle; and a mesh member, which is coupled to the upper frame and fixed at the front edge of the opening. The opening is opened and closed with a movable panel. The upper frame is raised and lowered with respect to the roof in accordance with an opening and closing operation of the movable panel. The mesh member is changed between a deployed state and a stored state in accordance with the raising and lowering of the upper frame. The upper frame includes a front end in a vehicle front-rear direction and a coupling position to which the mesh member is coupled. The upper frame includes a protrusion between the front edge and the coupling position.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Hereinafter, a deflector device for a vehicle according to one embodiment will be described. In the following description, the terms "front", "rear", "up", "down", and "lateral" are defined in relation to the vehicle.

Figure 1:
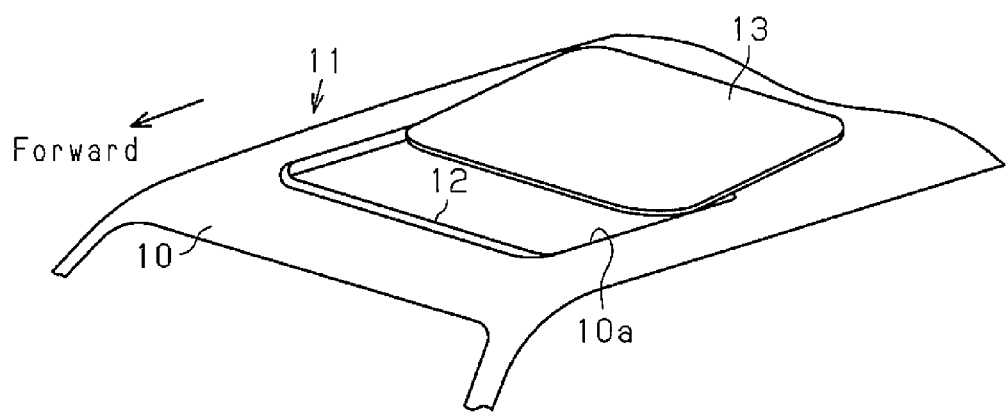
FIG. 1 is a perspective view of a sunroof device.

As shown in FIG. 1, a substantially tetragonal opening 10a is formed in a roof 10 of a vehicle such as a motor vehicle and a sunroof device 11 is mounted on the roof 10. The sunroof device 11 includes a deflector 12 and a substantially tetragonal movable panel 13. The deflector 12 extends in the lateral direction and is arranged along the front edge of the opening 10a. The movable panel 13 moves in the front-rear direction to open and close the opening 10a, and is formed of a glass plate, for example. That is, in the present embodiment, the sunroof device 11 corresponds to the deflector device for a vehicle.

The deflector 12 is coupled to the roof 10 such that the deflector 12 rotates about its rear portion so that the front portion is raised, that is, the deflector 12 performs a tilt-up operation. The deflector 12 is released from the movable panel 13 in accordance with the opening operation of the movable panel 13 to perform the tilt-up operation so that deflector 12 protrudes above the upper surface of the roof 10. The state is referred to as the deployed state of the deflector 12. The deflector 12 is pressed down by the movable panel 13 in accordance with the closing operation of the movable panel 13 so that the front portion is lowered to be stored below the upper surface of the roof 10. The state is referred to as the stored state of the deflector 12. The deflector 12 comes into the deployed state when the opening 10a is opened. This limits air vibration caused by swirling of the wind into the passenger compartment.

Figure 2:
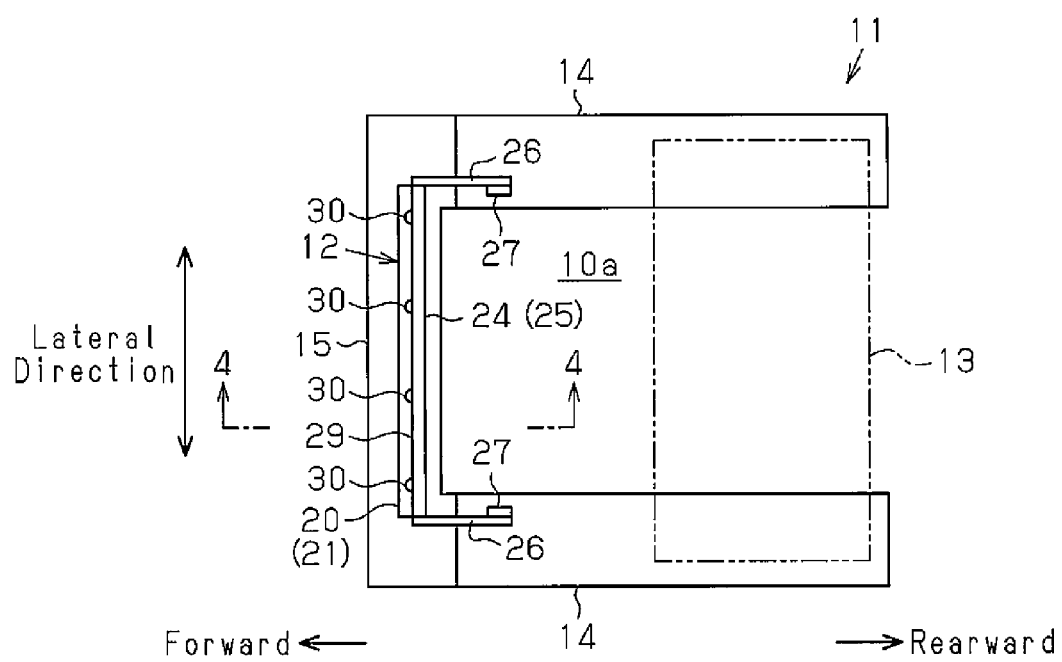
FIG. 2 is a top view schematically illustrating a configuration of a deflector in the sunroof device of FIG. 1.

As shown in FIG. 2, the sunroof device 11 includes two guide rails 14 arranged on corresponding side edges of the opening 10a in the lateral direction in the fixed state. Each guide rail 14 is formed of an extrusion material of an aluminum alloy, for example, has a constant cross section in the longitudinal direction, and extends in the front-rear direction. The sunroof device 11 includes a front housing 15 arranged along the front edge of the opening 10a in the fixed state. The front housing 15 is formed of a plastic, for example, and extends in the lateral direction, and the ends of the front housing 15 are connected to the corresponding front ends of the guide rails 14 so that the front housing 15 bridges the guide rails 14.

Appropriate driving mechanisms for opening and closing the movable panel 13 slide on the corresponding guide rails 14. The ends of the deflector 12 provided on the front housing 15 in the lateral direction are rotationally coupled to the corresponding front ends of the guide rails 14. Further, a sealing member 16 formed of a plastic, for example, is arranged on the circumferential edge of the opening 10a. The sealing member 16 seals between the circumferential edge of the opening 10a and the movable panel 13 when the movable panel 13 is in the closed state.

Next, the deflector 12 will be further described.

Figure 3:
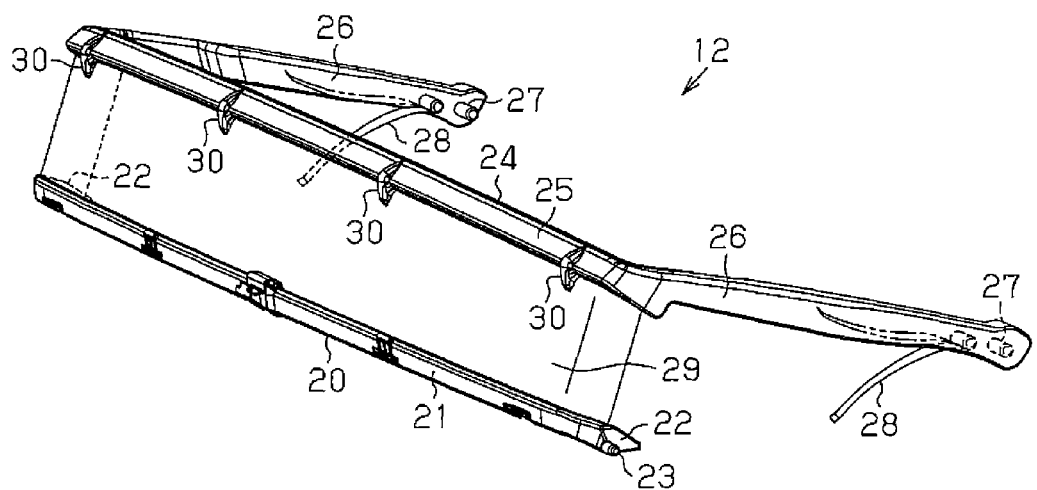
FIG. 3 is a perspective view illustrating the deflector of FIG. 2 in a deployed state.

As shown in FIG. 3, the deflector 12 includes a lower frame 20, which serves as a base frame held and fixed on the front housing 15, i.e., the front edge of the opening 10a. The lower frame 20 includes a lower frame body 21, which extends in the lateral direction along the front edge of the opening 10a, and two coupling portions 22, which extend rearward from the ends of the lower frame body 21. Holding projections 23, which protrude away from each other in the lateral direction, are formed on the corresponding coupling portions 22. The holding projections 23 are inserted through the corresponding coupling holes formed in the front housing 15. This couples the coupling portions 22 to the front housing 15 to hold and fix the lower frame 20 on the front housing 15.

The deflector 12 includes an upper frame 24, which is rotationally supported by the guide rails 14. The upper frame 24 includes an upper frame body 25, which extends in the lateral direction along the front edge of the opening 10a. The upper frame body 25 faces the lower frame body 21 in the deployed state of the deflector 12. The upper frame 24 also includes two coupling arms 26, which extend rearward from the ends of the upper frame body 25. Two rotation projections 27, which protrude toward each other in the lateral direction, are formed on the corresponding coupling arms 26. The rotation projections 27 are inserted into the corresponding rotation holes formed in the guide rails 14. This couples the coupling arms 26 with the corresponding guide rails 14 so that the upper frame 24 is rotationally supported by the guide rails 14.

A lever spring 28 formed of a spring steel plate, for example, is arranged between each guide rail 14 and the corresponding coupling arm 26. Each lever spring 23 is held by the corresponding rotation projection 27. The lever springs 28 bias the upper frame 24 in the raising direction when the movable panel 13 is in the open state.

A mesh member 29 that is formed of a plastic, for example, is coupled to the lower frame body 21 and the upper frame body 25 such that the mesh member 29 extends in the longitudinal direction of the lower frame body 21 and the upper frame body 25. The mesh member 29 is substantially band-like in the deployed state of the deflector 12.

Figure 4:
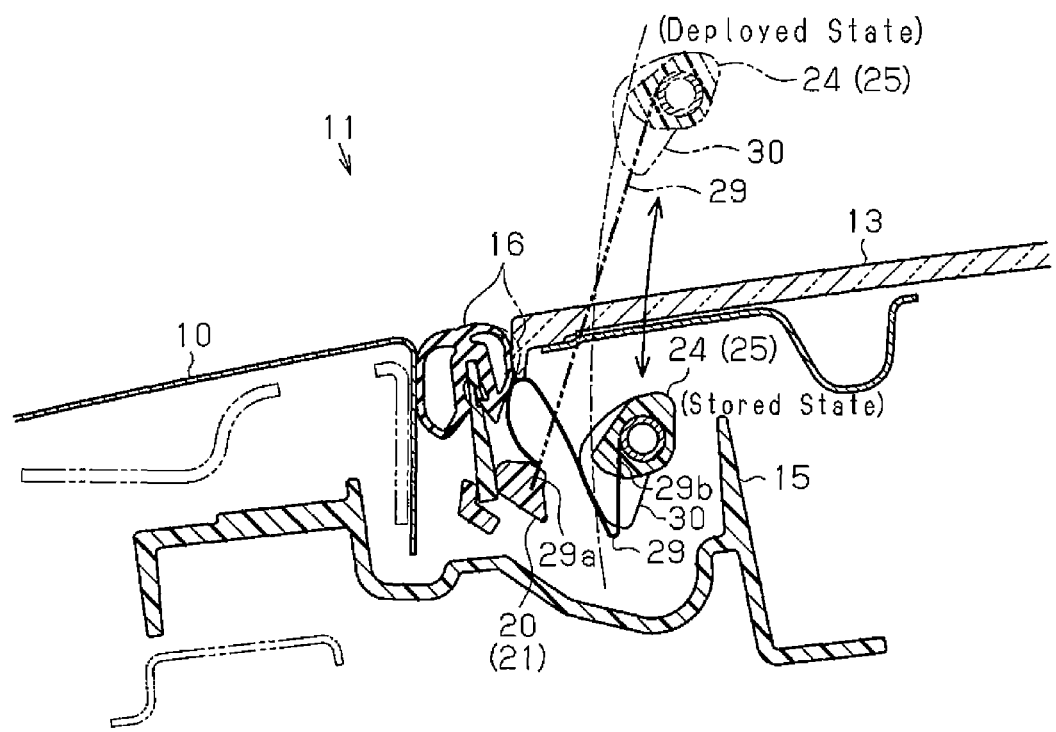
FIG. 4 is a cross-sectional view taken along line 4-4 in FIG. 2.

As shown in FIG. 4, the mesh member 29 includes a lower end portion (the first end portion) 29a and an upper end portion (the second end portion) 29b, which extend over the entire length of the mesh member 29 in the longitudinal direction. The lower end portion 29a is embedded in the lower frame body 21, and the upper end portion 29b is embedded in the upper frame body 25. The end portions 29a and 29b are formed integrally with the lower frame body 21 or the upper frame body 25 by insert molding, for example.

As shown in FIGS. 3 and 4, claw-like protrusions 30 are formed on a plurality of positions (in the present embodiment, four positions) of the upper frame body 25 such that the protrusions 30 are arranged at even intervals in the longitudinal direction of the upper frame body 25. Each protrusion 30 protrudes forward from the upper frame body 25, and protrudes from the upper frame body 25 toward the lower frame body 21 along the mesh member 29. Each protrusion 30 protrudes from the upper frame body 25 in the direction in which the deflector 12 changes from the deployed state to the stored state. Accordingly, the portion (outlined portion in FIG. 4) of the upper frame body 25 on which each protrusion 30 is formed includes a cross-sectional shape that protrudes forward from the upper frame body 25 and protrudes toward the lower frame body 21 with respect to the portion (hatched portion in FIG. 4) in which the protrusions 30 are not formed.

Each protrusion 30 is formed between the front end of the upper frame body 25 and the position of the upper frame body 25 into which the mesh member 29 is embedded, i.e., the position of the upper frame body 25 to which the mesh member 29 is coupled. Further, each protrusion 30 is formed across the mesh member 29. That is, the mesh member 29 is embedded into a portion from the tip end of each protrusion 30 into the upper frame body 25 at a position in which each protrusion 30 is formed.

Next, the process in which the deflector 12 changes from the deployed state to the stored state will be described.

When the upper frame 24 is released from the movable panel 13 in accordance with the opening operation of the movable panel 13, the upper frame 24 is biased by the lever springs 28 and rotated about the rotation projections 27 in the raising direction from the roof 10 (lower frame 20).

When the upper frame 24 is rotated in the raising direction, as shown by long dashed double-short dashed lines in FIG. 4, the deflector 12 is deployed such that the mesh member 23 coupled to the lower frame 20 and the upper frame 24 is expanded in the transverse direction (upward) to protrude on the surface of the roof 10. That is, the upper frame 24 is raised so that the deflector 12 comes into the deployed state.

In contrast, when the movable panel 13 is closed from the deployed state of the deflector 12, the upper frame 24 is pressed down by the movable panel 13 in accordance with the closing operation. This rotates the upper frame 24 about the rotation projections 27 against the biasing force of the lever springs 28 in the lowering direction. At the time, the upper frame 24 operates such that the mesh member 29 is stored between the upper frame 24 and the lower frame 20.

That is, when the upper frame 24 is rotated in the lowering direction, as shown by solid line in FIG. 4, the deflector 12 is stored such that the mesh member 29 coupled to the lower frame 20 and the upper frame 24 is contracted (folded) in the transverse direction (downward) to be stored below the upper surface of the roof 10. That is, the upper frame 24 is lowered so that the deflector 12 comes into the stored state.

In the stored state, the mesh member 29 extends upward from the lower frame 20, and is then folded in the opposite direction, i.e., downward around the sealing member 16 and the movable panel 13. The mesh member 29 is further folded in the opposite direction, i.e., upward on the line passing through the lower ends of a plurality of the protrusions 30. In the stored state, the deflector 12 is stored such that the mesh member 29 is not caught between the movable panel 13 and the sealing member 16, i.e., the circumferential edge of the opening 10a.

Next, operation of the present embodiment will be described.

For example, if the protrusions 30 were not present, the mesh member 29 would be unlikely to be properly drawn in downward and folded when storing the deflector 12. If the mesh member 29 were not properly folded, the mesh member 29 would likely to be caught between the circumferential edge of the opening 10a and the movable panel 13.

In contrast, in the present embodiment, when the upper frame 24 is lowered from the deployed state of the deflector 12, the protrusions 30 of the upper frame 24 allow the mesh member 29 to be drawn in downward. When the deflector 12 changes from the deployed state to the stored state, the mesh member 29 is reliably drawn inward by the protrusions 30 of the upper frame 24, and is properly folded. This limits occurring of a situation in which the mesh member 29 is not properly drawn inward.

It is considered that parts that guide the mesh member 29 such that the mesh member 29 is properly folded into the stored state are added. However, the addition of the parts causes other problems that the number of parts is increased.

In contrast, in the present, embodiment, it is not necessary to add separate parts since the protrusions 30 for properly drawing the mesh member 29 inward are formed integrally with the upper frame 24 (upper frame body 25).

Since the protrusions 30 protrude along the mesh member 29, the mesh member 29 is more reliably drawn inward when the mesh member 23 changes from the deployed state to the stored state.

The effect of the protrusions 30 drawing the mesh member 29 inward becomes weaker as the distance from the protrusions 30 increases along the length of the upper frame main body 25. In this regard, a plurality of the protrusions 30 is arranged in the longitudinal direction of the upper frame body 25. This allows the protrusions 30 to properly draw the mesh member 29 inward over the entire length of the upper frame body 25 in the longitudinal direction.

In the sunroof device 11, it is known that a ventilation sound of the high frequency band is generated when the apparent wind of a vehicle blows against the mesh member 29.

In this regard, the velocity of the apparent wind is changed around each protrusion 30 with respect to the portions that are free from the protrusions 30. This disperses the frequency band of the ventilation sound generated by the mesh member 29. That is, the apparent wind blows against each protrusion 30 so that the velocity of the apparent wind is reduced around each protrusion 30 with respect to the portions that are free from the protrusions 30. Accordingly, the frequency of the ventilation sound around each protrusion 30 is lower than the portions that are free from the protrusions 30. In particular, the high frequency band of the ventilation sound is dispersed.

Figure 5:
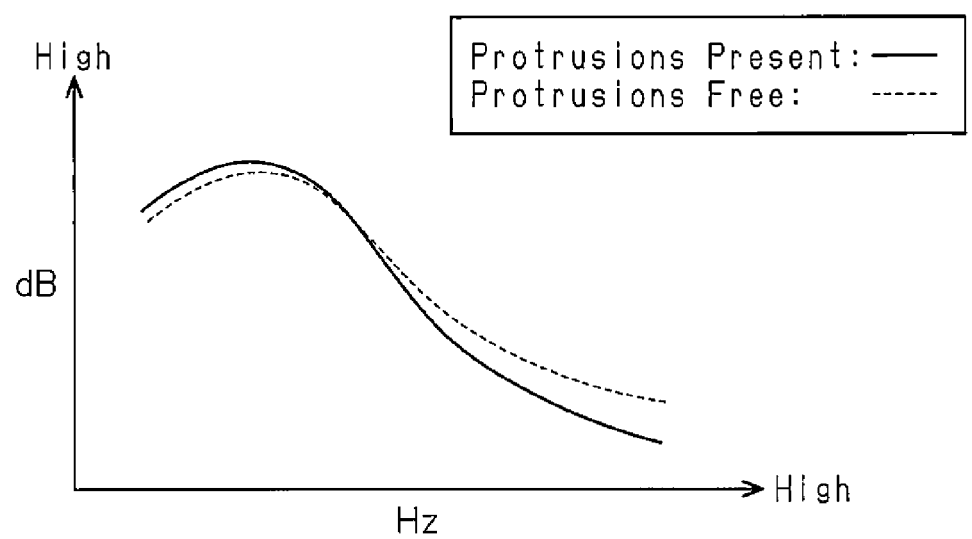
FIG. 5 is a graph illustrating a relationship between the sound pressure level (dB) and the frequency (Hz) of a ventilation sound.

As shown in FIG. 5, in the case where the protrusions 30 are present (refer to the solid line in FIG. 5), in comparison to the case where the protrusions 30 are not present (refer to the dotted line in FIG. 5), regarding the ventilation sound generated by the mesh member 29, especially the sound pressure level in the high frequency band, i.e., the noise of high-pitched sound is reduced.

The present embodiment has the following advantages.

(1) Occurring of a situation in which the mesh member 29 is not properly drawn inward is limited. This inhibits the mesh member 29 from being caught between the circumferential edge of the opening 10a in the roof 10 and the movable panel 13.

(2) Since the protrusions 30 for properly drawing the mesh member 29 inward are formed integrally with the upper frame 24, separate parts need not be added. This limits the increase of the number of parts and limits the increase of the costs.

(3) Since the protrusions 30 protrude along the mesh member 29, the mesh member 29 is more reliably drawn inward when the mesh member 29 changes from the deployed state to the stored state. This also limits the enlargement of a space needed for the movement of the upper frame 24.

(4) In particular, the high frequency band of the ventilation sound is dispersed so that high-pitched sound of the noise caused by the ventilation sound is reduced.

(5) Since the protrusions 30 draw the mesh member 29 inward over the entire length of the mesh member 29, the protrusions 30 are effectively operated.

(6) The mesh member 29 is embedded in a portion from the tip end (lower end) of each protrusion 30 into the upper frame body 25 at a position in which each protrusion 30 is formed. Accordingly, even if the mesh member 29 in the deployed state flaps during running of the vehicle, striking between the protrusions 30 and the mesh member 29 caused by the flap is limited. This limits the generation of a striking noise.

(7) The protrusions 30 are formed across the mesh member 29. This properly draws the mesh member 29 inward even if the upper frame 24 in the stored state is located at any position with respect to the lower frame 20 and the mesh member 29.

The above embodiment may be performed in the following manner.

In the stored state, the upper frame 24 may be located forward from the lower frame 20.

The number of the protrusions 30 may be changed to one, two, or four or more.

The protrusions 30 need not be formed across the mesh member 29 as long as the protrusions 30 extend along the mesh member 29.

The protrusions 30 may be in any of the form in which the protrusions 30 protrude forward from the upper frame body 25 or protrude toward the lower frame body 21. That is, for example, the protrusions 30 need not protrude along the mesh member 29. The protrusions 30 may protrude only forward from the upper frame body 25.

The protrusions 30 need not be formed integrally with the upper frame 24. Instead, the protrusions 30 may be formed separate from the upper frame 24 and attached to the upper frame 24.

The shape of the protrusions 30 may be of any shape as long as the protrusions 30 draw the mesh member 29 inward. The shape of the protrusions 30 may be a bar-shaped, for example.

The protrusions 30 may be formed to have a certain width in the longitudinal direction of the upper frame body 25. However, it is desirable that the protrusions 30 do not extend over the entire length of the upper frame body 25 in the longitudinal direction. That is, it is preferable that a plurality of the protrusions 30 be arranged at predetermined intervals in the longitudinal direction of the upper frame body 25.

As long as each protrusion 30 is arranged between the front end of the upper frame body 25 and the position in which the mesh member 29 is embedded, the position in which each protrusion 30 is arranged may be changed. For example, as in the above modified embodiment, when the cross-sectional shape of each protrusion 30 protrudes forward from the upper frame body 25, the protrusion 30 may be formed on the front end of the upper frame body 25.

The mesh member 29 may also be directly held and fixed on the front housing 15. In this case, the front housing 15 serves as a base frame. That is, the end portion 29a of the mesh member 29 may be fixed to an appropriate member at the front edge of the opening 10a.

The lower frame 20 may be held by an appropriate bracket fixed to the roof 10.

The coupling arms 26 may be omitted in the upper frame 24. In this case, for example, the lower frame 20 and the upper frame 24 may be coupled by an appropriate biasing member (e.g., compression coil spring), and the biasing member is expanded and contracted with the mesh member 29 so that the deflector 12 may be changed between the deployed state and the stored state.

Therefore, the present examples and embodiments are to be considered as illustrative and not restrictive and the invention is not to be limited to the details given herein, but may be modified within the scope and equivalence of the appended claims.

The invention clamed is:

1. A deflector device for a vehicle, comprising:
an upper frame, which is arranged along a front edge of an opening formed in a roof of a vehicle, the opening being opened and closed with a movable panel, wherein the upper frame is raised and lowered with respect to the roof in accordance with an opening and closing operation of the movable panel; and
a mesh member, which is coupled to the upper frame and fixed at the front edge of the opening, wherein the mesh member is changed between a deployed state and a stored state in accordance with the raising and lowering of the upper frame, wherein the upper frame includes a front end in a vehicle front-rear direction and a coupling position to which the mesh member is coupled, the upper frame includes a protrusion between the front end and the coupling position, the protrusion protrudes forward from the upper frame and protrudes downward from the upper frame along the mesh member, and the protrusion is arranged on both sides of the mesh member in the vehicle front-rear direction.

2. The deflector device according to claim 1, wherein the protrusion is formed integrally with the upper frame.

3. The deflector device according to claim 1, wherein the protrusion is one of a plurality of protrusions arranged in a longitudinal direction of the upper frame.

4. The deflector device according to claim 2, wherein the protrusion is one of a plurality of protrusions arranged in a longitudinal direction of the upper frame.

5. The deflector device according to claim 1, wherein the mesh member is supported by a base frame arranged along the front edge of the opening.

6. The deflector device according to claim 1, wherein the protrusion protrudes forward and downward from a region of the upper frame that includes the front end and the coupling position so that the protrusion guides the mesh member to allow the mesh member to be drawn in downward and folded into the stored state when the upper frame is lowered from the deployed state of the mesh member.

7. The deflector device according to claim 1, wherein the mesh member includes a first end coupled to the upper frame and a second end fixed at the front edge of the opening, and the first end is located rearward of the second end when the mesh member is in the stored state.

* * * * *